(12) United States Patent
Shin et al.

(10) Patent No.: US 8,194,331 B2
(45) Date of Patent: Jun. 5, 2012

(54) LENS FOR CONCENTRATION PHOTOVOLTAIC MODULE

(75) Inventors: Hwa-Yuh Shin, Longtan Shiang (TW); Hung-Zen Kuo, Longtan Shiang (TW); Hwen-Fen Hong, Longtan Shiang (TW); Hung-Sheng Chiu, Longtan Shiang (TW); Chun-Yi Chen, Longtan Shiang (TW)

(73) Assignee: Atomic Energy Council—Institute of Nuclear Research, Taoyuan County (TW)

( * ) Notice: Subject to any disclaimer, the term of this patent is extended or adjusted under 35 U.S.C. 154(b) by 237 days.

(21) Appl. No.: 12/637,973

(22) Filed: Dec. 15, 2009

(65) Prior Publication Data
US 2010/0254028 A1 Oct. 7, 2010

(30) Foreign Application Priority Data
Apr. 2, 2009 (TW) ................................ 98111088 A

(51) Int. Cl.
*G02B 3/08* (2006.01)

(52) U.S. Cl. ................ 359/742; 359/642; 136/243
(58) Field of Classification Search .................. 359/642, 359/741, 742; 136/243–265
See application file for complete search history.

(56) References Cited

U.S. PATENT DOCUMENTS

| | | | | |
|---|---|---|---|---|
| 3,873,188 A | * | 3/1975 | Baeker | 359/742 |
| 5,091,018 A | * | 2/1992 | Fraas et al. | 136/246 |
| 6,947,212 B2 | * | 9/2005 | Karasawa et al. | 359/457 |
| 2003/0117713 A1 | * | 6/2003 | Border et al. | 359/619 |
| 2010/0037935 A1 | * | 2/2010 | Vaid et al. | 136/246 |

* cited by examiner

*Primary Examiner* — Darryl J Collins
(74) *Attorney, Agent, or Firm* — Jackson IPG PLLC; Demian K. Jackson

(57) ABSTRACT

A lens device includes a base, groups of prism-like elements formed on the base and at least two alignment points formed on the base. Each of the groups and a related portion of the base form a lens. Each of the prism-like elements comprises an incidence surface in the form of a camber. The alignment points are used for alignment of a laser device with the lens device.

6 Claims, 4 Drawing Sheets

(Prior Air)

LENS FOR CONCENTRATION PHOTOVOLTAIC MODULE

FIELD OF THE INVENTION

The present invention relates to a concentration photovoltaic module and, more particularly, to a lens modification for a concentration photovoltaic module.

DESCRIPTION OF THE RELATED ARTS

Referring to FIG. 3, a conventional Fresnel lens 2 includes miniature prism-like elements each formed with an incidence surface 21 that extends in a plane. The loss of optical gets worse as the number of the miniature prism-like elements gets larger. Therefore, it is difficult to increase the efficiency of such a Fresnel lens.

Referring to FIG. 4, a conventional Fresnel lens device 2a includes a 2×4 array of Fresnel lenses 2 for example. Ribs 22 are provided between any two adjacent ones of the Fresnel lenses 2 and around the Fresnel lenses 2. The ribs 22 are used to reinforce the strength of the Fresnel lens device 2a. The ribs 22 however increase the ineffective area of the Fresnel lens device 2a and therefore reduce the efficiency of the Fresnel lens device 2a.

Moreover, there has not been any lens for a photovoltaic module that includes an alignment point and an alignment window for precise alignment of a lens to a solar cell. Therefore, it is believed that current Fresnel lenses are not adequate for use.

The present invention is therefore intended to obviate or at least alleviate the problems encountered in prior art.

SUMMARY OF THE INVENTION

It is the primary objective of the present invention to provide a highly efficient lens device.

To achieve the foregoing objective, the lens device includes a base, groups of prism-like elements formed on the base and at least two alignment points formed on the base. Each of the groups and a related portion of the base form a lens. Each of the prism-like elements comprises an incidence surface in the form of a camber. The alignment points are used for alignment of a laser device with the lens device.

Other objectives, advantages and features of the present invention will become apparent from the following description referring to the attached drawings.

BRIEF DESCRIPTIONS OF THE DRAWINGS

The present invention will be described via detailed illustration of the preferred embodiment versus the prior art referring to the drawings.

DESCRIPTION OF THE PREFERRED EMBODIMENT

Figure 1:
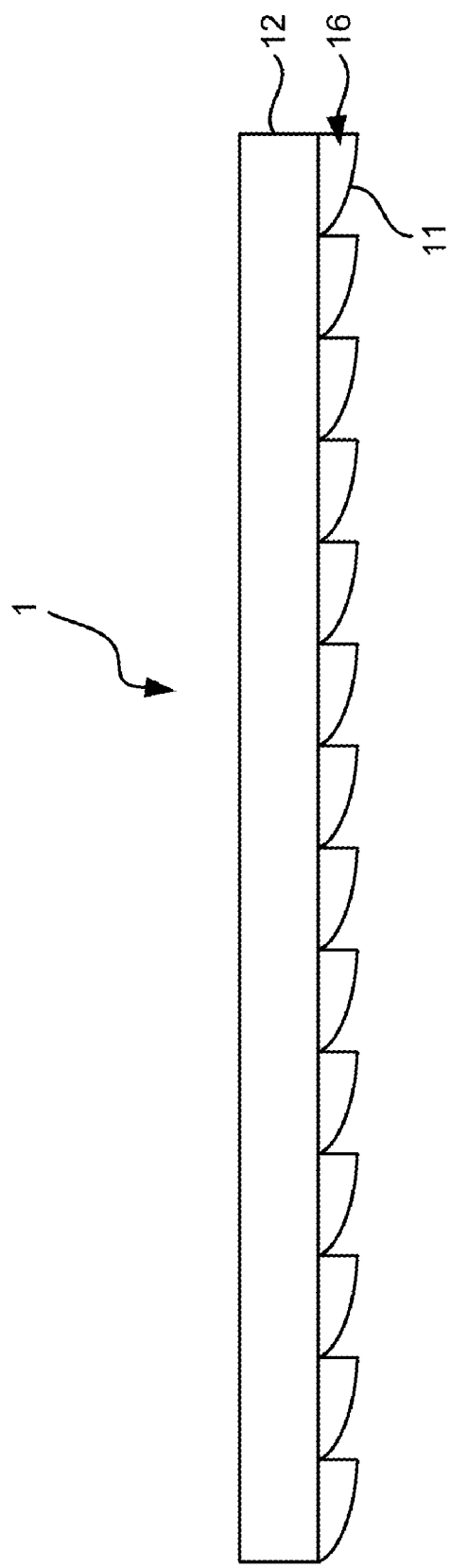
FIG. 1 is a partial side view of a Fresnel lens according to the preferred embodiment of the present invention.
Figure 2:
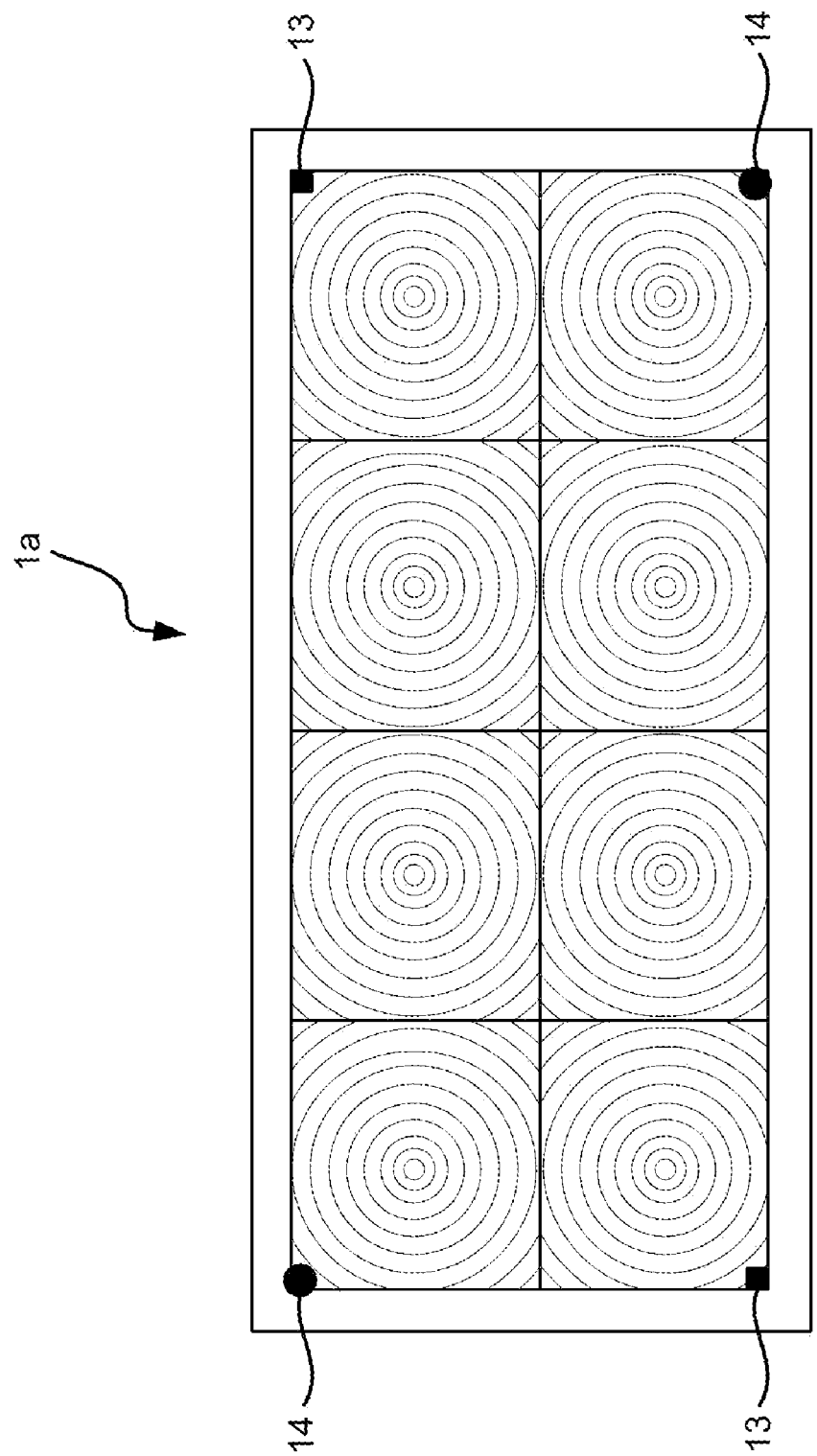
FIG. 2 is a top view of a Fresnel lens device including Fresnel lenses as shown in FIG. 1.
Figure 3:
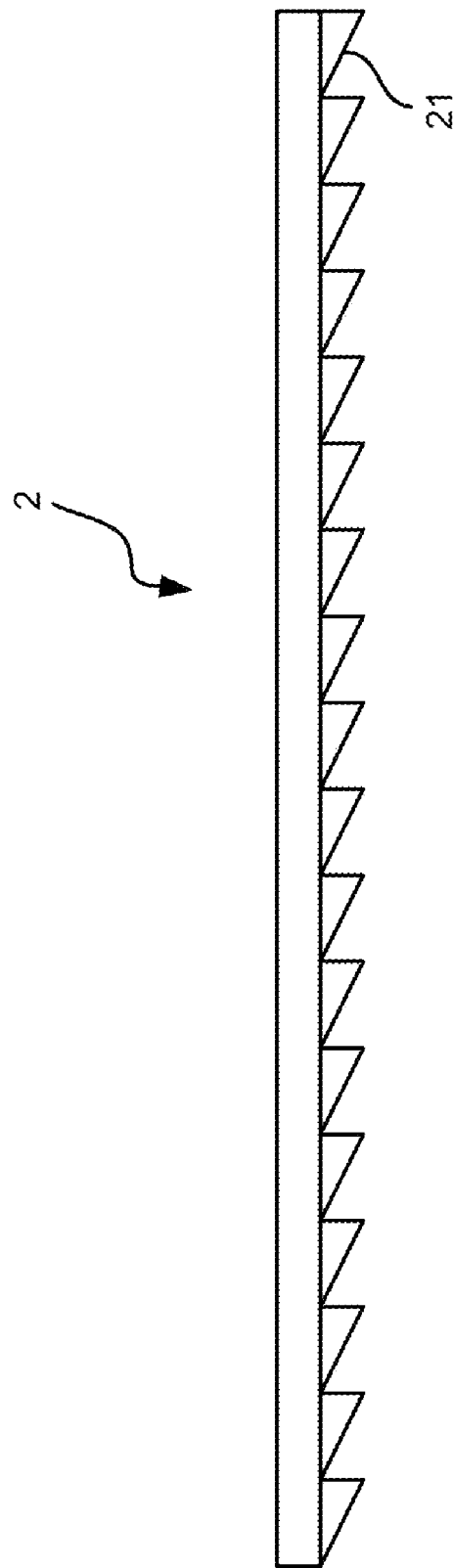
FIG. 3 is a partial side view of a conventional Fresnel lens.
Figure 4:
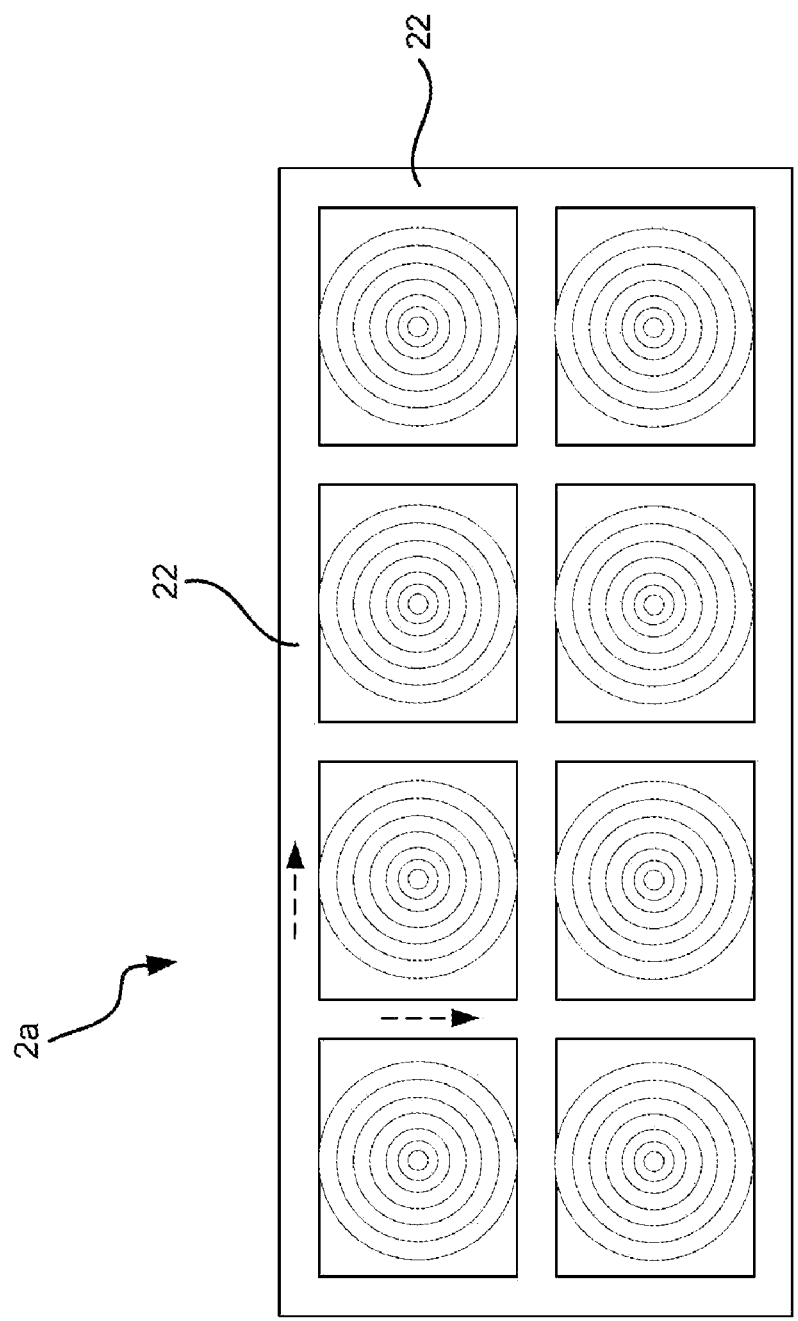
FIG. 4 is a top view of a Fresnel lens device including Fresnel lenses as shown in FIG. 3.

Referring to FIGS. 1 and 2, a Fresnel lens device 1a includes a 2×4 array of Fresnel lenses 1 according to the preferred embodiment of the present invention. Each of the Fresnel lenses 1 includes a base 12 and prism-like elements 16. The base 12 includes an upper surface and a lower surface parallel to the upper surface. The prism-like elements 16 are formed on the upper surface of the base 12. Each of the prism-like elements 16 includes an incidence surface 11. The incidence surface 11 of each of the prism-like elements 16 extends in a camber for increasing the groove space of the Fresnel lens 1 and therefore the efficiency. The base 12 is made with adequate thickness, i.e., made with adequate strength to support the prism-like elements 16. Hence, there is no need for any ribs to reinforce the Fresnel lens device 1a.

Moreover, the Fresnel lens device 1a includes at least two alignment points 13 and two alignment windows 14 formed on the upper surface of the base 12. The alignment points can be convex or concave. The alignment points 13 are used for mechanical alignment. The alignment windows 14 are used for optical alignment such as laser-based alignment. With the alignment points 13 and the alignment windows 14, the Fresnel lens device 1a can be precisely aligned with solar cells, thus reducing the tolerance in making a photovoltaic module.

The Fresnel lens device 1a of the present invention exhibits several advantages over the conventional Fresnel lens device 2a discussed in the Related Prior Art. Firstly, the efficiency of the Fresnel lens 1 is higher than that of the conventional Fresnel lens device 2a because the incidence surface 11 of each of the prism-like elements 16 extends in a camber, instead of a plane, to increase the groove space of the Fresnel lens 1.

Secondly, the ineffective area of the Fresnel lens device 1a is smaller than that of the convention conventional Fresnel lens device 2a because the Fresnel lens device 1a includes the adequately thick base 12 and therefore does not need the ribs 22 of the conventional Fresnel lens device 2a.

Thirdly, the Fresnel lens device 1a provides a photovoltaic module with more precise assembly and therefore higher efficiency than the conventional Fresnel lens device 2a for including the alignment points 13 and the alignment windows 14 for precisely aligning the Fresnel lens device 1a with solar cells.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A lens device comprising:
   a base with groups of prism-like elements formed on the base so that each of the groups of prism-like elements and a related portion of the base form a lens, wherein each of the prism-like elements comprises an incidence surface in the form of a camber; and
   at least two alignment windows formed on the base and configured for optical alignment of the lens device with solar cells.

2. The lens device according to claim 1, wherein each of the lenses is a Fresnel lens.

3. The lens device according to claim 1, wherein the optical alignment is laser-based alignment.

4. The lens device according to claim 1, further comprising one or more alignment points configured for mechanical alignment of the lens device with solar cells.

5. The lens device according to claim 4, wherein the alignment points are concave.

6. The lens device according to claim 4, wherein the alignment points are convex.

* * * * *